(12) United States Patent
Jaynes

(10) Patent No.: US 10,293,200 B1
(45) Date of Patent: May 21, 2019

(54) EXERCISE/ACTIVITY SYSTEM FOR TETHERING PURPOSES

(71) Applicant: Mary Beth Jaynes, Bellingham, WA (US)

(72) Inventor: Mary Beth Jaynes, Bellingham, WA (US)

(73) Assignee: Mary Beth Jaynes, Custer, WA (US)

( * ) Notice: Subject to any disclaimer, the term of this patent is extended or adjusted under 35 U.S.C. 154(b) by 107 days.

(21) Appl. No.: 15/330,874

(22) Filed: Nov. 9, 2016

(51) Int. Cl.
*A01K 27/00* (2006.01)
*A63B 21/00* (2006.01)
*A41F 9/00* (2006.01)

(52) U.S. Cl.
CPC ........ *A63B 21/00185* (2013.01); *A01K 27/00* (2013.01); *A41F 9/005* (2013.01); *A63B 21/4039* (2015.10)

(58) Field of Classification Search
CPC ............ A62B 35/0012; A41D 13/0007; A01K 27/003
USPC ........................................................ 119/795
See application file for complete search history.

(56) References Cited

U.S. PATENT DOCUMENTS

| | | | |
|---|---|---|---|
| 1,229,003 A | 6/1917 | Winter | |
| 3,165,168 A * | 1/1965 | Rose ...................... | A62B 35/00 182/3 |
| 3,324,818 A | 6/1967 | Dunlap | |
| 4,103,758 A * | 8/1978 | Himmelrich ....... | A62B 35/0012 182/3 |
| 4,396,013 A | 8/1983 | Hasslinger | |
| 4,396,091 A * | 8/1983 | Anderson .......... | A62B 35/0068 182/3 |
| 4,441,707 A | 4/1984 | Bosch | |
| 4,478,311 A * | 10/1984 | Anderson .......... | A62B 35/0068 119/857 |
| 5,010,850 A * | 4/1991 | Sailer ..................... | A01K 27/00 182/3 |
| 5,067,585 A * | 11/1991 | Bell .................... | A62B 35/0012 182/7 |
| 5,289,590 A * | 3/1994 | Larson ............... | A41D 13/0007 2/227 |
| 5,411,461 A | 5/1995 | Thomascik | |
| 5,615,750 A | 4/1997 | Phillips | |
| 5,704,880 A | 1/1998 | Amatulle | |
| 5,752,900 A | 5/1998 | Holland | |
| 5,792,034 A | 8/1998 | Kozlovsky | |
| 6,027,001 A | 2/2000 | Levitan | |
| 6,056,412 A | 5/2000 | Atlee | |
| 6,105,169 A * | 8/2000 | Colorado ........... | A62B 35/0025 182/6 |

(Continued)

*Primary Examiner* — Joshua T Kennedy

(57) ABSTRACT

An integrated system of straps that is used for exercise and activity. The straps are gathered at a waist band that is sewn into a garment, and the straps wrap around the waist and the buttocks of a person. The straps are attached to the garment by sewing, and the straps exit the garment through pockets, that can be used to stow the straps when not in use. The system offers a comfortable tethering system, while wearing a fashionable, athletic outfit. The system is used for centralized, balanced pulling or towing from the front center or back center of the person's midsection. The system is applicable to any sports activity that is appropriate for tethering to a moving animal or object, and also, for pulling an object such as a sled.

10 Claims, 6 Drawing Sheets

(56) References Cited

U.S. PATENT DOCUMENTS

| | | | |
|---|---|---|---|
| 6,308,335 B1 * | 10/2001 | Colorado | A41D 13/0007 |
| | | | 182/6 |
| 6,352,484 B1 | 3/2002 | Killion | |
| 6,490,733 B1 * | 12/2002 | Casaubon | A41D 13/0007 |
| | | | 2/79 |
| 7,267,080 B2 | 9/2007 | Gallo | |
| 7,284,505 B1 | 10/2007 | Paxton | |
| 7,401,793 B1 | 7/2008 | Hite | |
| 8,316,469 B2 * | 11/2012 | Miller | A41D 1/08 |
| | | | 2/227 |
| 8,342,137 B1 * | 1/2013 | Burkhardt | A01K 27/004 |
| | | | 119/770 |
| 8,522,364 B2 * | 9/2013 | O'Brien | A41D 27/02 |
| | | | 2/227 |
| 10,016,633 B2 * | 7/2018 | Perner | A62B 35/0012 |
| 2002/0042942 A1 * | 4/2002 | Colorado | A41D 13/0007 |
| | | | 2/230 |
| 2016/0044975 A1 * | 2/2016 | Linden | A62B 35/0006 |
| | | | 2/227 |

* cited by examiner

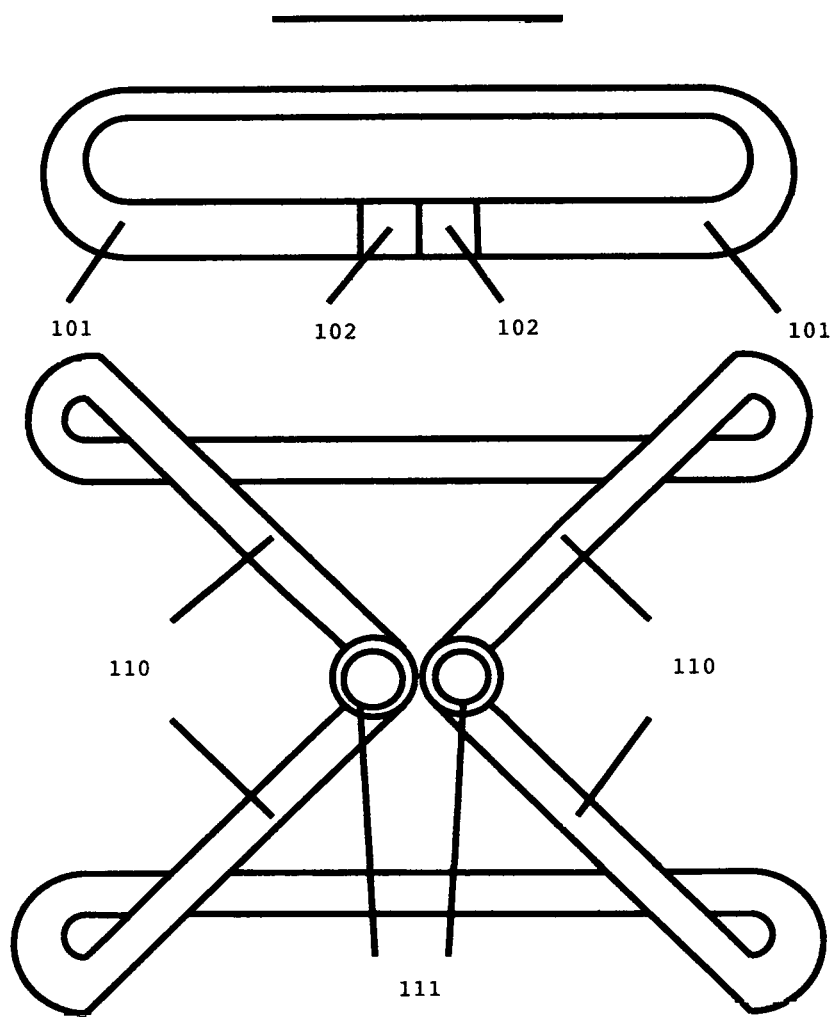

EXERCISE/ACTIVITY SYSTEM FOR TETHERING PURPOSES

CROSS-REFERENCED TO RELATED APPLICATIONS

Not applicable.

FEDERALLY SPONSORED RESEARCH

Not applicable.

BACKGROUND

Field of Invention

This application relates to the activities where one is tethered to something else. This includes skijoring, defined as the action of being pulled on snow while wearing skis by a horse, dog or a snow machine. It also applies to using a pulk, defined as a sled used to carry equipment that is towed behind one who is cross-country skiing or snowshoeing. Another activity that this invention is related to is canicross. Canicross is running behind ones dog while one is tethered to said dog that is running in front of a person. This invention is also related to walking a dog, and any other activity that may find this hands free exercise/activity system for tethering purposes useful.

Prior Art

The following is a listing of prior art that is relevant:

| Cited Patent | Filling Date | Publication Date | Applicant | Title |
|---|---|---|---|---|
| U.S. Pat. No. 5,411,461 A | Apr. 6, 1993 | May 2, 1995 | Thomascik, Terrance A. | Skijor Belt |
| U.S. Pat. No. 7,284,505 B1 | Nov. 2, 2004 | Oct. 23, 2007 | Paxton, Stephen E., Lugo-Paxton, Lisa M. | Skijor System |
| U.S. Pat. No. 3,324,818 A | Mar. 18, 1966 | Jun. 13, 1967 | Carroll, Gene Dunlap | Towing Arrangement for Water Sking and the Like |
| U.S. Pat. No. 4,396,013 A | Dec. 3, 1980 | Aug. 2, 1983 | Hasslinger, Russell | Support and Guide Strap |
| U.S. Pat. No. 4,441,707 A | Jul. 15, 1981 | Apr. 10, 1984 | Bosch, Jack L. | Isometric Exerciser Belt for Joggers and the Like |
| U.S. Pat. No. 5,704,880 A | Oct. 7, 1996 | Jan. 6, 1998 | Amatulle, Pasquale J. | Device for an Arm Free Inclined Treadmill Workout |
| U.S. Pat. No. 5,752,900 A | Mar. 13, 1997 | May 19, 1998 | Holland, Robert R. | Exercise Belt Apparatus |
| U.S. Pat. No. 5,792,034 A | Mar. 18, 1997 | Aug. 11, 1998 | Kozlovsky, Oren | Muscle Building Body Adhering Apparatus |
| U.S. Pat. No. 6,027,001 A | Feb. 18, 1999 | Feb. 22, 2000 | Levitan, Gregg | Wagon Harness |
| U.S. Pat. No. 6,056,412 A | Nov. 21, 1997 | May 2, 2000 | Atlee, Eckhardt Atlee, Elizabeth Steven David | Waist Mounted Illuminating Device |
| U.S. Pat. No. 6,352,484 B1 | Jun. 9, 2000 | Mar. 5, 2002 | Killion, Darryl | Apparatus for Soccer Training |
| U.S. Pat. No. 7,267,080 B2 | Aug. 12, 2005 | Sep. 11, 2007 | Gallo, Renata, Gallo, Robert | Child Support Harness |
| U.S. Pat. No. 7,401,793 B1 | May 29, 2005 | Jul. 22, 2008 | Hite, Joseph M. | Roller-Tow Harness |
| U.S. Pat. No. 1,229,003 A | Apr. 11, 1916 | Jun. 5, 1917 | Winter, Christian | Climbing-Harness |
| U.S. Pat. No. 5,615,750 A | Apr. 3, 1995 | Apr. 1, 1997 | Phillips, Douglas D. | Climbing Harness Having Adjustable Leg Loops and Rise |

Prior Art

Dogs are walked with leashes that are held by a person while walking or running. While a person is walking or running, it is cumbersome to hold onto a leash.

People who skijor and people who canicross will wear a belt to tether themselves to a dog. Skijor and canicross belts are cumbersome, unsightly and ill fitting. This is one more item to remember and carry with oneself while getting to a location to do the activity. The belts used for skijoring and canicross are unsightly as they are worn on the outside of ones clothing. There is a diaper style skijor belt that is extremely ugly as it looks like one is wearing underwear or a diaper over their pants. Skijoring and canicross belts do not always fit ones waist well and can fall down or ride up ones waist. This affects ones effectiveness at skijoring or canicross.

SUMMARY OF THE INVENTION

The exercise/activity system for tethering purposes has the straps sewn into strong materials that can take the force of tethering to something else. This system can be used for being pulled, towing something or other tethering activities. One of the systems purposes is that it functions to fit. This system offers active people an opportunity to have the external parts of it hidden from view in the side pockets until it is needed for an activity that involves tethering.

The advantages of this invention include:
(a) It is a simple, unique system that offers a way to exercise or do an activity that involves tethering to something else.
(b) This exercise/activity system functions to fit.
(c) This system has a strong fashionable waist.
(d) This system has an integrated belt and buckle that allows for a comfortable, snug fit around ones waist.
(e) The convenience of having this activity system sewn or otherwise attached into the inside of materials one puts onto ones body and wears. No need to carry the extra separate gear of a waist harness or a skijor belt while traveling to an activity location, as one is already wearing this system.

(f) Being hands free while doing an activity such as dog walking or canicross.

(g) No unsightly external belt or ugly diaper style skijor belt system is seen when doing a tethering activity or not doing an activity.

(h) The external parts of this system including straps or connection device or devices can be hidden from view when not doing a tethering activity. The said external parts can be placed in the side holding elements or pockets for storage.

(i) Using this tethering or towing exercise/activity system is as easy as slipping on a pair of pants, shorts, dress or skirt.

(j) One can carry keys, ID, water bottle and other essentials in the accessories that can be built into the strong waist belt.

(k) This system has an adjustable belt with a strong buckle built into the strong waist belt area. This allows for this system to stay in place and not slip up or down ones waist.

BRIEF DESCRIPTION OF THE DRAWINGS

The following unique features of the exercise/activity system for tethering purposes are illustrated in the following figures so this system can be visualized and better understood.

FIG. 1B Illustrates the exercise/activity system for tethering purposes by itself.

DETAILED DESCRIPTION OF THE INVENTION

Figure 1A:
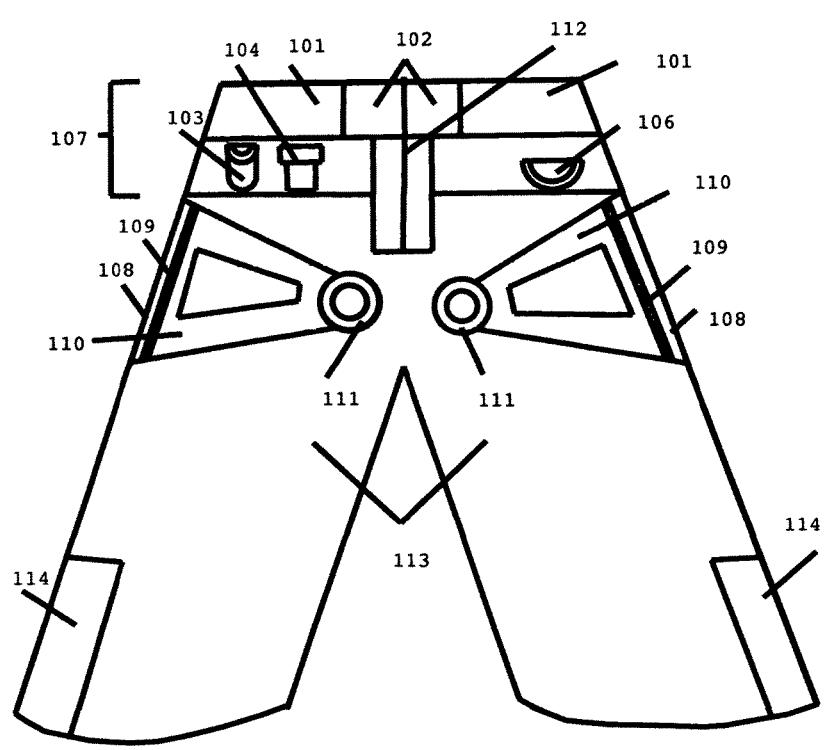
FIG. 1A Illustrates a frontal view of the exercise/activity system for tethering purposes when it is attached into pants.

FIG. 1A This embodiment illustrates the tethering exercise/activity system sewn into pants. This system can be incorporated into any clothing including pants, shorts, skirts and dresses. The waist (107) is made with strong outdoor polyester fabric or any other strong fabric that can support the force of being tethered to something that will pull or something that a person can tow. The clothing materials can have an insulated layer in the middle of primaloft, thinsulate or any other insulating materials for an added layer of warmth for cold and arctic weather.

The adjustable belt (101) uses strong nylon material or any other appropriate material and can be tightened or loosened for comfort and fit with a buckle (102). The buckle (102) can be a parachute cord bracelet buckle, a side release buckle, a center release buckle or any other type of buckle that can take the force of a tethering activity. This buckle (102) assists in firmly holding the belt (101) at ones waist so the exercise/activity system for tethering purposes does not ride up ones waist or fall down ones waist while one is doing a tethering activity.

There is a zipper (112) at the center of the front of the system. Instead of a zipper, velcro can be used for closure or any other appropriate closure system. If the system is incorporated into a dress, a skirt or other clothing, the zipper or closure may not be needed and left out.

One can sew on accessories, attach Velcro or use another attachment material to hold items onto the strong waist (107), this can include a water bottle holder attachment (103), a pocket to hold items including a cell phone or ID, keys attachment (104), a D-ring (106) of an appropriate size to attach a foldable dog bowl or a bag of dog treats or any other essentials.

These attachments added onto the strong waist can be used for anything that is needed for an activity that involves tethering. These accessories can be modified to better suit the purpose of the tethering activity.

If the system is integrated into pants such as in FIG. 1, it can have side opening and closure flaps (114) for the easy application of the ski boots, taking off of ski boots, mountaineering boots or any other type of shoes used for an appropriate activity.

The straps (110) are integrated and sewn or otherwise attached into materials including pants, shorts, a skirt or a dress and can be sewn into an inner lining in the materials. Two straps (110) encircle the back of the pants. One upper strap (110) encircles the waist and the other lower strap (110) encircles the area of buttocks of a person and these straps exit the upper and lower side pockets (108). The straps (110) can be made out of nylon or any other appropriate strong material. These straps are connected to a strong metal O-ring (111) or other strong connecting device or devices. The purpose of this connecting device or devices (111) is to attach oneself to something else. These O-rings (111) or other connecting device or devices can be connected by a carabiner of appropriate strength or other appropriate attachment device or devices and then the carabiner is connected to a rope or something else like a strap for pulling purposes, towing purposes or other tethering activities.

The side pockets (108) can be opened and closed with velcro (109) or any other closure material deemed most appropriate for the activity. The straps (110) and the connected O-ring (111) can be rolled up and inserted into the side pockets (108) and then the pockets are velcro shut. This allows for the straps to be stowed away while keeping a stylish appearance when one is not doing the tethering exercise or activity.

FIG. 1B Illustrates the structure of the exercise/activity system for tethering purposes is composed of an adjustable belt (101), a buckle (102), straps (110), and O-rings (111). This system can be sewn or otherwise attached into materials and then worn on ones body.

Figure 2:
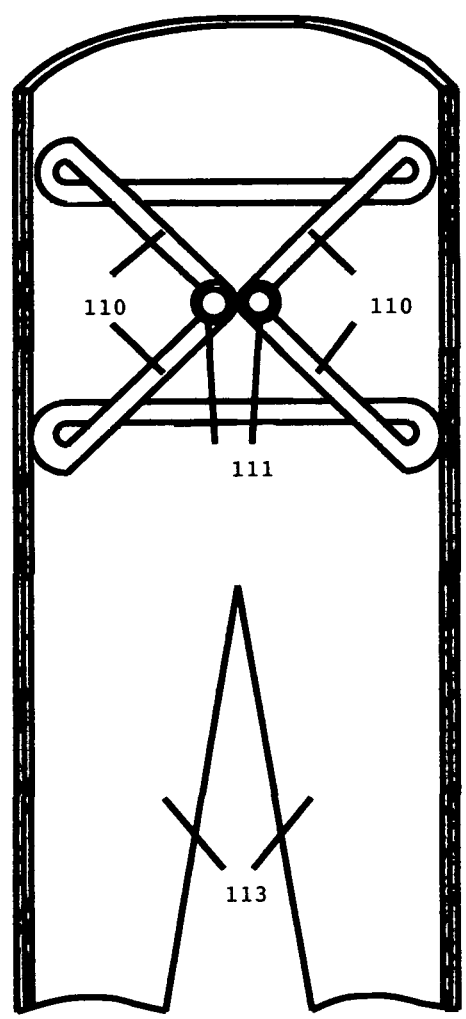
FIG. 2 Illustrates the back panel of the pants with the exercise/activity system for tethering purposes attached into it.

FIG. 2 This embodiment illustrates a view of the inside back panel of pants (113) where the incorporated system is sewn into the back panel of the waist area (107) and the buttocks area of the pants. This can be also integrated into other materials that can be worn including shorts, skirts and dresses. The straps (110) are illustrated here and are sewn into the back panel of the pants (113). The upper and lower straps (110 A) exit through the upper and lower side pockets (108) or side holding elements. The side pockets or side holding elements are not shown in this illustration to give a clear view of the inside of the back pants (113) panel. This integrated supporting strap system (110) has O-rings (111) sewn onto each of the ends of the right and the left straps. This allows for a balanced centered pulling or towing force during a multitude of tethering activities.

Figure 3:
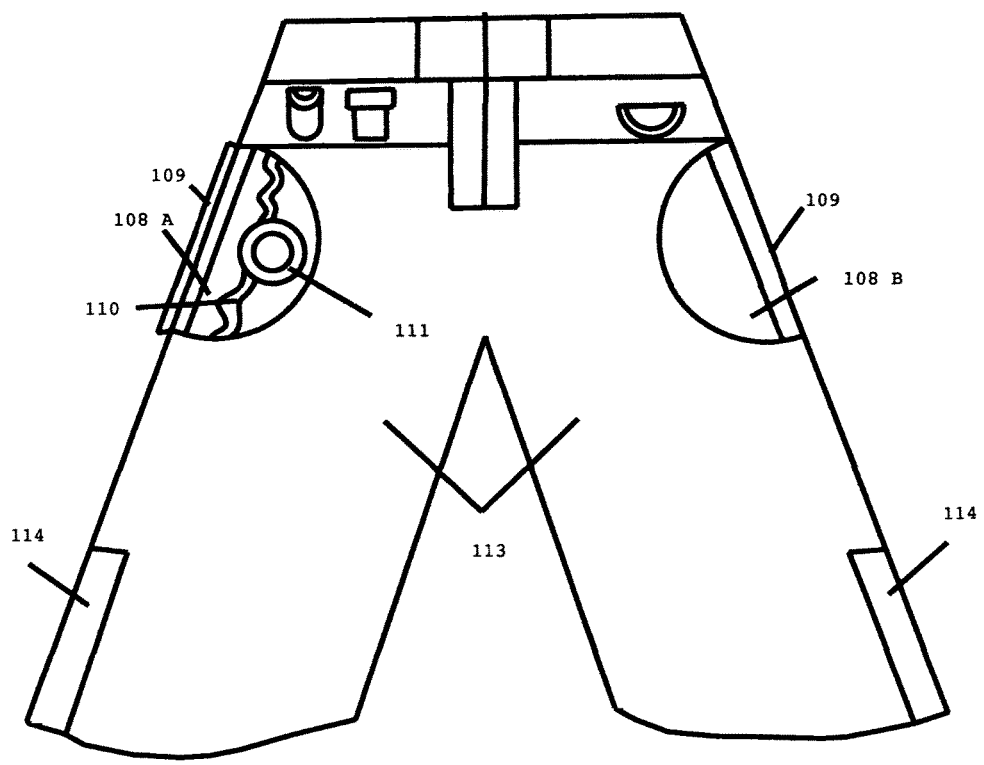
FIG. 3 Illustrates one open and one closed pocket or holding element.

FIG. 3 This figure illustrates the velcro (109) in one open pocket (108 A) and one closed side pocket (108 B). The open pocket (108 A) shows the strap (110) and O-ring (111)

inserted inside of it. The closed pocket (108 B), shows the pocket (108 B) has been shut and there is no ugly strap (110) and O-ring (111) seen as they are tucked away inside the pocket (108 B). This pocket (108 B) is velcro shut while the straps (110) are not in use.

Figure 4:
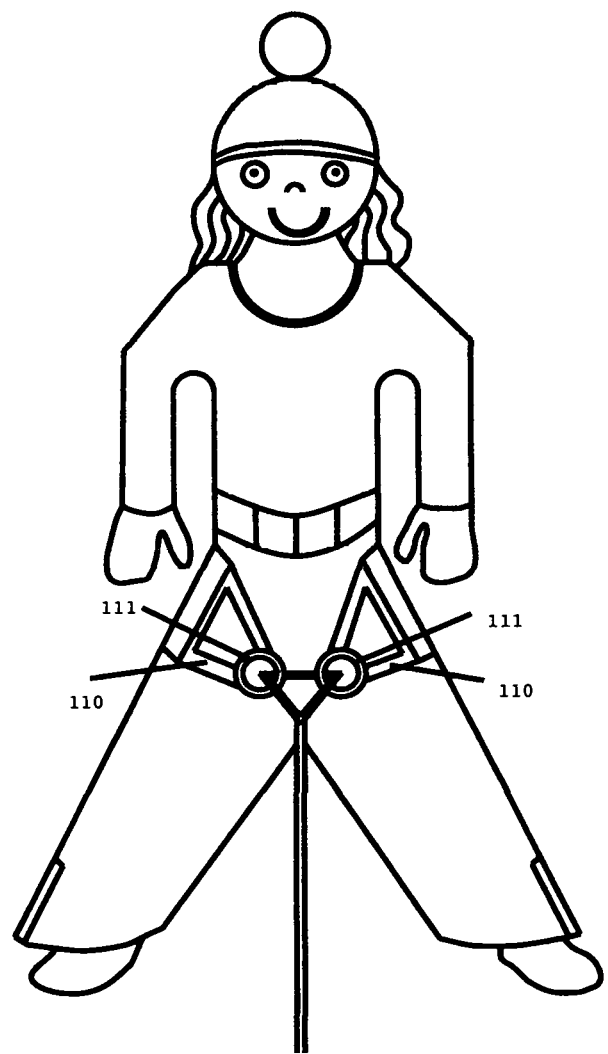
FIG. 4 Illustrates the exercise/activity system for tethering purposes being used while one is skijoring.

FIG. 4 This figure illustrates one of the many uses of this system including skijoring with one's dog. Here the straps (110) are being used to tether a person to a dog so the dog can pull the person for skijoring.

Figure 5:
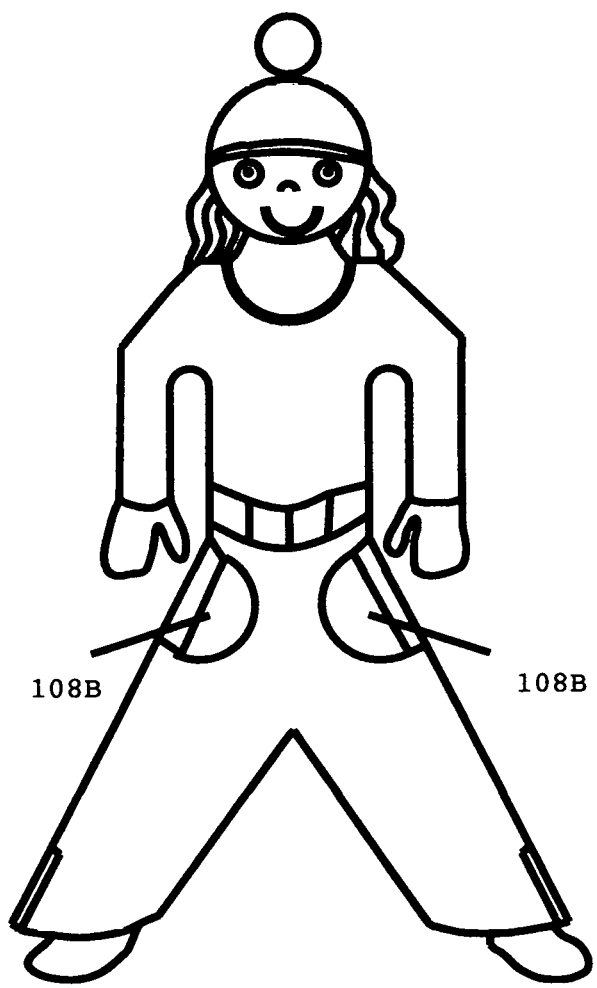
FIG. 5 Illustrates the exercise/activity system for tethering purposes while it is not in use and external parts are stored away.

FIG. 5 Illustrates the integrated exercise/activity system for tethering purposes when it is stowed away in the pockets. These pockets are velcro shut while the system is not in use. The straps and O-rings are tucked away into the closed pockets (108 B).

OPERATION

The operation of this exercise/activity system works by having this system sewn or otherwise attached into the inside of the materials of what one is wearing. The main purpose of this exercise/activity system is that it allows for one to tether to something else. This system has an adjustable strong belt inside of the waist materials and a strong buckle. This strong adjustable belt and buckle functions to fit a person snugly and comfortably while they are doing a tethering activity. The O-rings or appropriate connection device or devices can be connected with a carabiner or any other appropriate attachment device to a rope for attachment to something else. This allows for activities that involve either a person being pulled by an animal or object, a person towing an object or any other activity where a person is tethered to something else. When this system is not in use, one can place the straps and O-rings or connecting device or devices into the side pockets or holding elements and close them shut.

SUMMARY

This integrated exercise/activity system for tethering purposes is a unique system for when one is either being pulled by something or is towing something. This system is sewn into or otherwise attached into the materials that a person is wearing. This system functions to fit. This system combines and integrates separate functional elements into ones clothing. This provides a harmonious interrelated whole system, whose main purpose is to allow for tethering to something else. This system can be used to tether to dogs, a sled and anything else that is appropriate for tethering purposes.

Composed of strong materials, this tethering exercise system is built to last. The waist belt is made up of strong materials and includes an extension of material along the back. The buttocks area of this system is also composed of strong materials. This system is made up of tough materials. This allows for this system to take the tug of a dog, horse or a multitude of other outdoor activities including canicross and dog walking.

Straps are sewn or otherwise attached into the inside of ones clothing. This allows for parts of the straps to be out of sight and a fashionable look. The straps exit out of the pockets or side materials on each side of what a person is wearing. The straps end in metal hoops or another connecting device or devices that can be connected by a carabiner or other attaching device. This carabiner or other attaching device is attached to a rope or bungee line that is attached to an animal or an object that pulls or an object to be towed.

The side pockets or side holding elements have velcro or another type of closing system attached into them. When a person is not skijoring or doing other activities the straps can be inserted into the side pockets or side holding elements. The straps and connection devices are stored in the pockets or holding elements.

The strong waist allows for attaching accessories around the waist that can hold keys, ID, money, a water bottle holder and hoops to hook on doggie poop bag holders and any other essentials.

When appropriate for an activity adjustable straps can also be sewn into fabric around the thigh area to loop around the legs for greater support and stability while doing an activity.

The exercise/activity system for tethering purposes is an invention that is made so it functions to fit a person well. This system is attached into what one is wearing so one can have a fashionable appearance while wearing the system. The system can be made out of materials that provide warmth in harsh cold environments or lighter materials for warm climates. The exercise/activity system for tethering purposes has limitless possibilities and can be made with various materials as to best suit the needs of what activity one is doing and where. This system is quick and easy to put on and off and is as easy as slipping on a pair of pants, shorts, a skirt or a dress.

CONCLUSIONS, RAMIFICATIONS AND SCOPE

This exercise/activity system for tethering purposes is unique. The system is for when one is either being pulled by something, is towing something or is doing any other appropriate tethering activity. This system has many advantages. It is designed to be strong and is able to take the force of being pulled or towing something. This system has a comfortable fit and has an adjustable belt and buckle resulting in a snug fit. It looks good and allows for one to be fashionable because the tethering straps can be stowed out of view in ones side pockets. The system is easy and convenient to use. All one needs to do is open up the pockets and pull out the straps for use. This system has multiple uses including but not limited to being pulled by a dog or horse while one is skijoring, being pulled by a snow machine while one is on skis or while towing a sled behind one's self.

While the above embodiment of the invention is preferred, there are no constraints to this particular form. No limitations to the scope or use of this invention are intended. Any design alternatives that are obvious to one of ordinary skill in the art are incorporated in this invention. This includes alternatives in shape, size, patterns and materials needed for different activities and different body types. These different activities can include, skijoring, canicross, hands free walking of dogs, towing a sled behind oneself among many other types of exercises and activities. Thus, this is the scope of the exercise/activity system for tethering purposes.

I claim:
1. An integrated system of straps that encircle the waist and buttocks of a human, which is used to tether said human to an animal or to a device wherein this device or these animals have independent locomotion, or wherein the tethered device is moved by said human, the system comprising:
   a garment having left and right pockets, the garment configured to be worn on a user's lower body;
   an adjustable belt;
   first and second straps integrated into a back panel of the garment;

the first strap configured to extend around a back of a user's waist, first and second ends of the first strap exit the garment from a top side of the left and right pockets, respectively;

the second strap configured to extend around buttocks of a user, first and second ends of the second strap exit the garment through a bottom side of the left and right pockets, respectively;

the first ends of the first and second straps being connected to a first O-ring and the second ends of the first and second straps being connected to a second O-ring; the O-rings located external from the garment and configured to facilitate attachment to a tethering element in front of a user's waist;

the left and right pockets further comprising closure flaps such that the first and second ends of the straps and the first and second O-rings may be concealed within the pockets when not in use.

2. The integrated system of straps, as in claim 1, wherein the system sewn into the garment renders it capable of withstanding force.

3. The integrated system of straps, as in claim 2 wherein said force falls between 10 to 245 Newtons (N), as exerted by a dog of 10 to 30 kilograms (kg), walking or running within a range of 1-10 meters/second.

4. The integrated system of straps, as in claim 2, wherein said force falls between 110 to 11,000 N as exerted by a device that weighs 110 kg to 230 kg, with independent locomotion within a range of 1-50 meters per second.

5. The integrated system of straps, as in claim 2 wherein the said force exerted on an object attached to the integrated system of straps moved by a human while walking, running or using a recreational means to move, (such as skiing), is between 2.2 to 1274 N for an object that weighs between 2.2 to 182 kg, and is moved between 1 to 7 meters per second.

6. The integrated system of claim 1, wherein said straps are comprised of nylon or polypropylene that can withstand a force between 10 to 11,000 N.

7. The integrated system of straps as in claim 1, wherein the waist on the garment is 2 to 6 inches in width.

8. The integrated system of straps as in claim 7, wherein said waist is wide enough at 2 to 6 inches in width, to accommodate attachment of accessories.

9. The integrated system of straps as in claim 8, wherein said accessories include portable items.

10. The integrated system of claim 1 that is used in an exercise or activity that comprises tethering a human to a device, object or animal, that is made from materials that can withstand environments ranging from about 60 degrees below zero degrees Fahrenheit to about 100 degrees Fahrenheit.

* * * * *